(12) United States Patent
Veeramachaneni

(10) Patent No.: US 8,886,572 B2
(45) Date of Patent: *Nov. 11, 2014

(54) SYSTEMS AND METHODS FOR RECORD LINKAGE AND PARAPHRASE GENERATION USING SURROGATE LEARNING

(76) Inventor: Sriharsha Veeramachaneni, St. Paul, MN (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/361,460

(22) Filed: Jan. 30, 2012

(65) Prior Publication Data

US 2012/0226655 A1 Sep. 6, 2012

Related U.S. Application Data

(63) Continuation of application No. 12/367,371, filed on Feb. 6, 2009, now Pat. No. 8,108,326, and a continuation-in-part of application No. 12/341,926, filed on Dec. 22, 2008.

(60) Provisional application No. 61/063,966, filed on Feb. 6, 2008.

(51) Int. Cl.
*G06N 5/02* (2006.01)
*G06N 7/00* (2006.01)
*G06F 17/30* (2006.01)

(52) U.S. Cl.
CPC .......... *G06N 7/005* (2013.01); *G06F 17/30067* (2013.01)
USPC ......................................................... 706/12

(58) Field of Classification Search
CPC ....................... G06N 7/005; G06F 17/30067
USPC ............................................. 706/12; 382/224
See application file for complete search history.

(56) References Cited

PUBLICATIONS

Veeramachaneni, S. and Kondadadi R.: Surrogate Learning From Feature Independence to Semi-Supervised Classification. Proceedings of the NAACL HLT Workshop on Semi-supervised Learning for Natural Language Processing, pp. 10-18, Boulder, Colorado, Jun. 2009.*

* cited by examiner

*Primary Examiner* — Jeffrey A Gaffin
*Assistant Examiner* — Ola Olude Afolabi
(74) *Attorney, Agent, or Firm* — Valenti, Hanley & Robinson, PLLC; Kevin T. Duncan

(57) ABSTRACT

A method of using unlabeled data to train a classifier is disclosed. In one embodiment related to record linkage, the method entails retrieving a set of candidate data records from a master database based on a least one update record. Next, a surrogate learning technique is used to identify one of the candidate data records as a match for the one update record. Lastly, the exemplary method links or merges the update record and the identified one of the candidate data records.

15 Claims, 4 Drawing Sheets

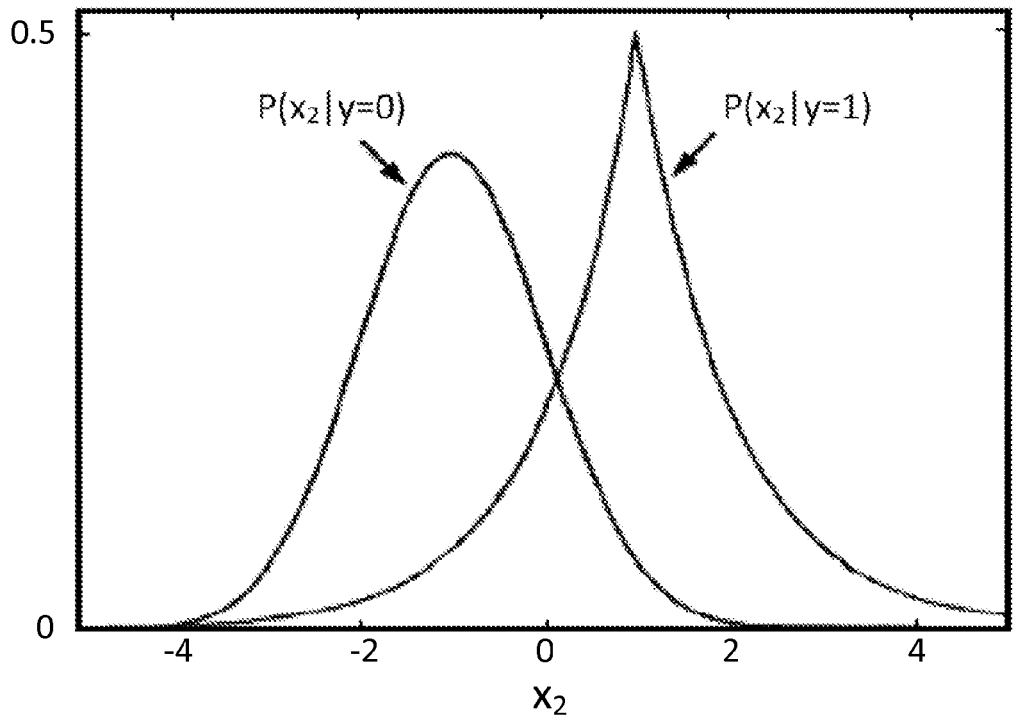
Figure 1. Class-conditional probability distributions of the feature $x_2$.
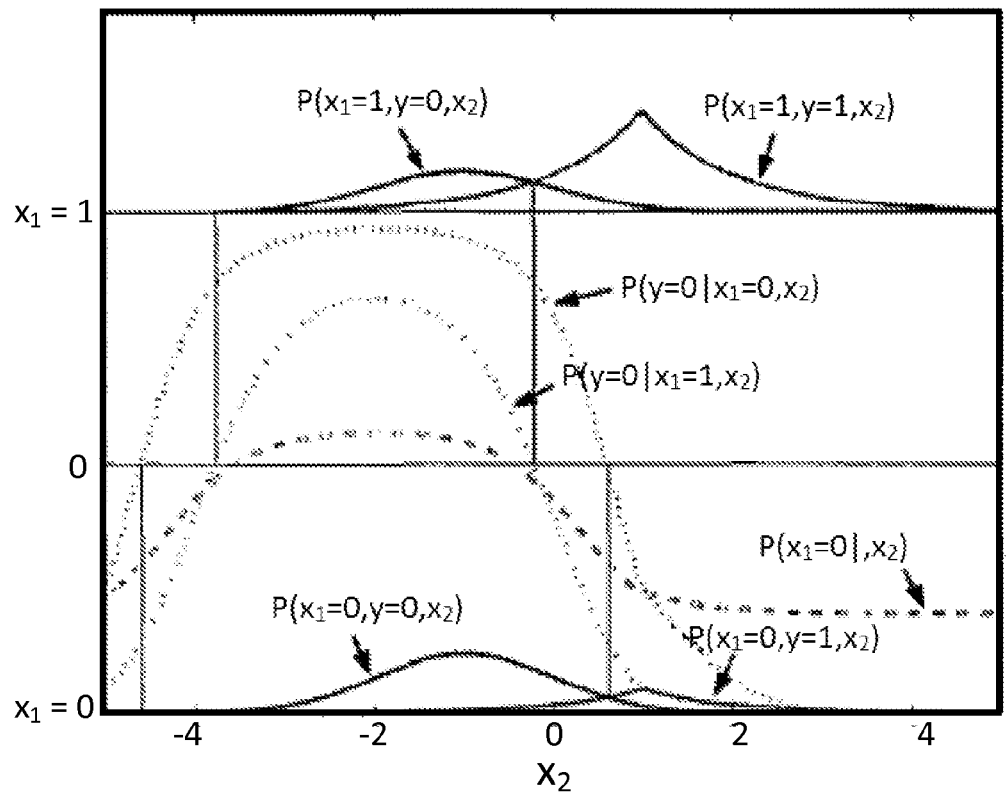
Figure 2. The joint distributions and the posterior distributions of the class y and the surrogate class $x_1$.

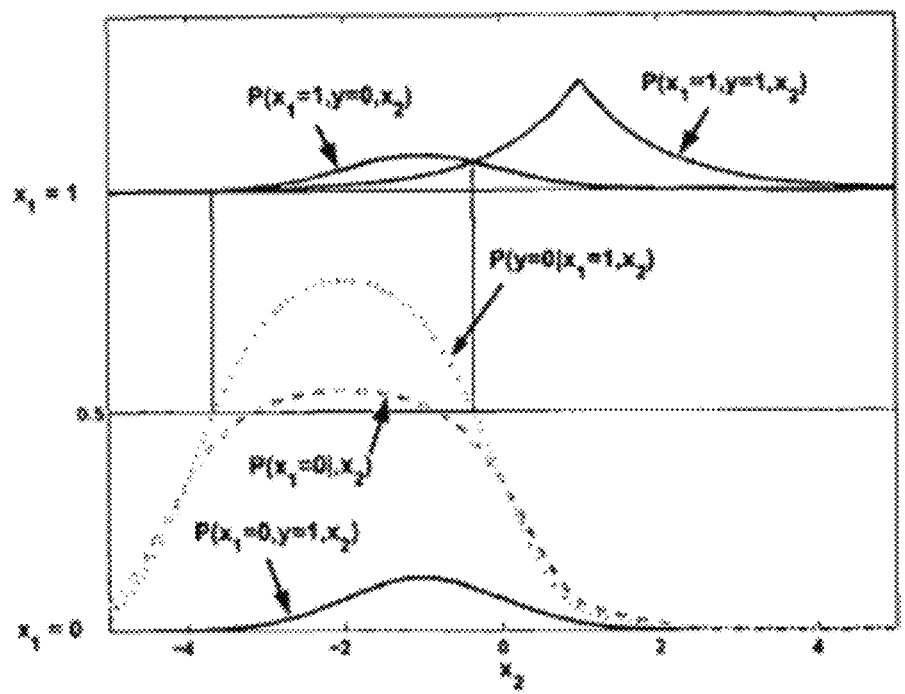
Figure 3. The joint distributions and the posterior distributions for the special case.

SYSTEMS AND METHODS FOR RECORD LINKAGE AND PARAPHRASE GENERATION USING SURROGATE LEARNING

RELATED APPLICATIONS

This application claims priority to U.S. Provisional Application No. 61/063,966, which was filed on Feb. 6, 2008, and to U.S. application Ser. No. 12/341,926, which was filed on Dec. 22, 2008, and as a continuation of U.S. application Ser. No. 12/367,371, which was filed Feb. 6, 2009, and which are all incorporated herein by reference. U.S. Provisional Applications Nos. 61/008,714 and 61/063,047, which were filed respectively Dec. 21, 2007 and Jan. 30, 2008, are also incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2007, Thomson Reuters Global Resources.

TECHNICAL FIELD

Various embodiments of the present invention concern machine-learning based classification systems and methods, particularly as used in record linkage for updating databases and/or paraphrase generation for event extraction.

BACKGROUND

A classifier is a computerized tool that classifies an input set of data according to a finite set of classes. One general form of classifier uses machine learning techniques to make classification decisions. Before using this type of classifier, it is necessary to train the classifier using preclassified data, referred to as labeled data. In general, the more labeled data that is available to train the classifier, the more accurate the classifier can be. However, labeled data is typically produced manually and is therefore expensive in terms of time and money. The expense of this type of data ultimately limits the practical application of classifiers.

SUMMARY

To address this and/or other needs, the present inventors devised, among other things, new classification methods and systems that do not require training using large sets of labeled data.

BRIEF DESCRIPTION OF DRAWINGS

FIG. 1 is a graph of class-conditional probability distributions of a feature x2, which corresponds to one or more embodiments of the present invention.

FIG. 2 is a graph of the joint distributions and the posterior distributions of the class y and the surrogate class x1 for an exemplary case of surrogate learning, which corresponds to one or more embodiments of the present invention.

FIG. 3 is a graph of joint distributions and the posterior distributions of the class y and the surrogate class x1 for a special case of surrogate learning, which corresponds to one or more embodiments of the present invention.

DETAILED DESCRIPTION OF THE EXEMPLARY EMBODIMENT(S)

Figure 4:
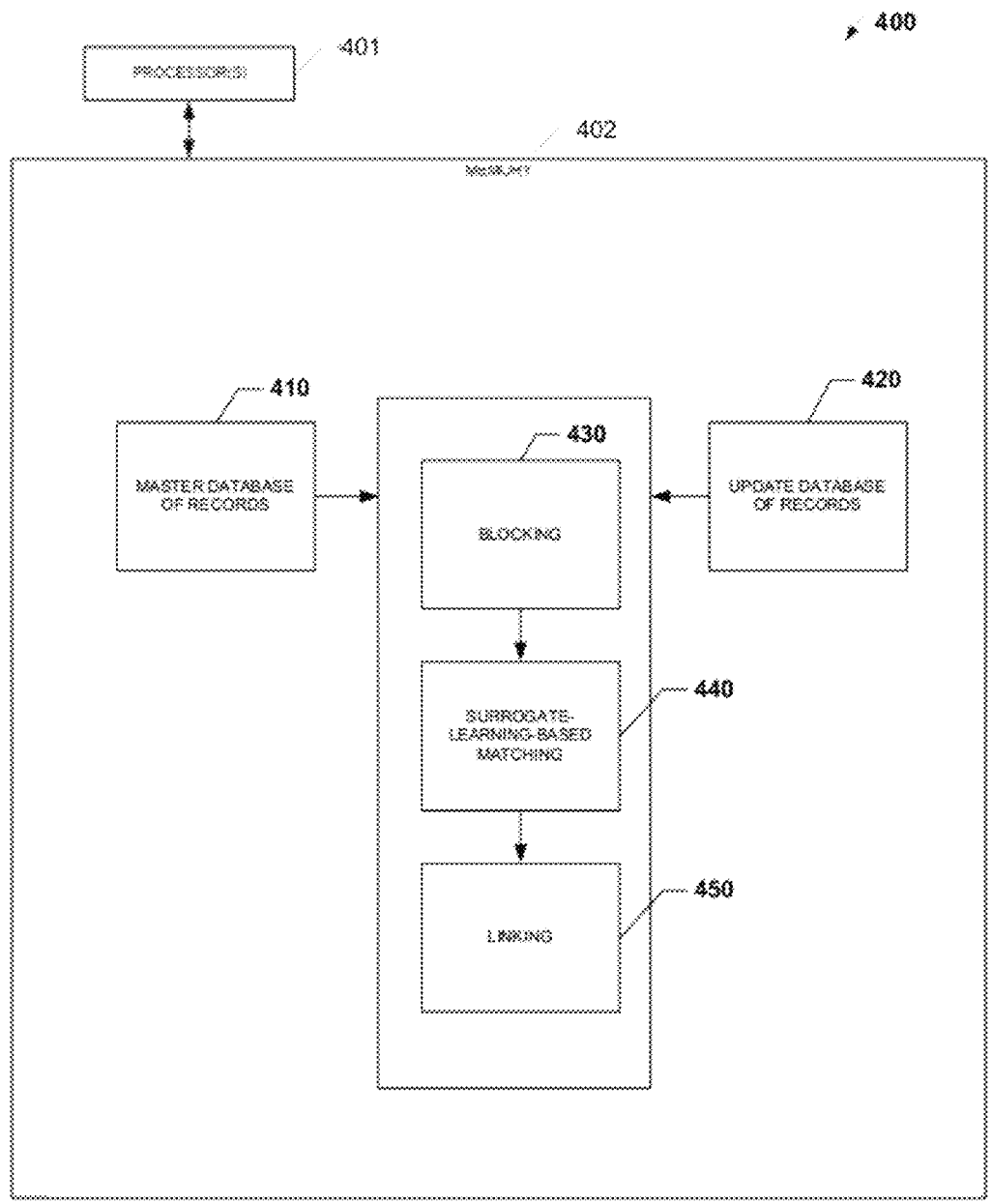
FIG. 4 is a block and flow diagram of an exemplary surrogate-learning-based system for record linkage and/or database merging, which corresponds to one or more embodiments of the present invention.

This document, which incorporates the drawings, the abstract, and the appended claims, describes one or more specific embodiments of one or more inventions. These embodiments, offered not to limit but only to exemplify and teach the invention(s), are shown and described in sufficient detail to enable those skilled in the art to implement or practice the invention(s). Thus, where appropriate to avoid obscuring the invention(s), the description may omit certain information known to those of skill in the art.

Overview

One or more of the exemplary system and methods involve semi-supervised learning, which refers to the case or situation when the learner or classifier exploits (a presumably large quantity of) unlabeled data to supplement a relatively small labeled sample, for accurate induction. At least some of the exemplary systems and methods embody a simple semi-supervised learning technique that relies on assumptions of class-conditional feature independence. In particular, when a feature set can be partitioned into two class-conditionally independent sets, the original learning problem can be reformulated in terms of the problem of learning a predictor from one of the partitions to the other. That is, the latter partition acts as a surrogate for the class variable. The novel technique is generally referred to herein as surrogate learning. The technique or methodology is described generally and then in two specific applications: one for record-linkage and the other for paraphrase generation.

General Surrogate Learning

The general surrogate learning technique can be understood in considering the problem of learning a classifier from the feature spade X to the set of classes $y=\{0,1\}$. Let the features be partitioned into $X=X1 \times X2$. The random feature vector $x \in X$ will be represented correspondingly as $x=(x1, x2)$. Since the exemplary embodiment is restricted to a two-class problem, the construction of the classifier involves the estimation of the probability $P(y=0|x1, x2)$ at every point $(x1, x2) \in X$.

The exemplary embodiment makes the following assumptions on the joint probabilities of the classes and features.

1. $P(x1,x2|y)=P(x1|y)P(x2|y)$ for $y \in (0,1)$. That is, the feature sets x1 and x2 are class-conditionally independent for both classes. Note that, when X1 and X2 are one-dimensional, this condition is identical to the Naive Bayes assumption, although in general this is weaker.
2. $P(x1|x2) \neq 0$, $P(x1|y) \neq 0$ and $P(x1|y=0) \neq P(x1|y=1)$. These assumptions are to avoid divide-by-zero problems in the algebra below. If x1 is a discrete valued random variable and not irrelevant for the classification task, these conditions are often satisfied.

Considering the quantity $P(y, x_1|x_2)$ allows one to derive the following equations.

$$P(y, x_1 | x_2) = P(x_1 | y, x_2)P(y | x_2) \quad (1)$$
$$\Rightarrow P(y, x_1 | x_2) = P(x_1 | y)P(y | x_2)$$
(from the independence assumption)
$$\Rightarrow P(y | x_1, x_2)P(x_1 | x_2) = P(x_1 | y)P(y | x_2)$$
$$\Rightarrow \frac{P(y | x_1, x_2)P(x_1 | x_2)}{P(x_1 | y)} = P(y | x_2)$$

Since $P(y = 0 | x_2) + P(y = 1 | x_2) = 1$, Equation 1 implies $$\frac{P(y=0|x_1x_2)P(x_1|x_2)}{P(x_1|y=0)} + \frac{P(y=1|x_1x_2)P(x_1|x_2)}{P(x_1|y=1)} = 1 \quad (2)$$
$$\Rightarrow \frac{P(y=0|x_1x_2)P(x_1|x_2)}{P(x_1|y=0)} + \frac{(1-P(y=0|x_1x_2))P(x_1|x_2)}{P(x_1|y=1)} = 1$$

Solving Equation 2 for $P(y = 0 | x_1, x_2)$, we obtain $$P(y = 0 | x_1 x_2) = \frac{P(x_1|y=0)}{P(X_1|x_2)} \cdot \frac{P(x_1|y=1) - P(x_1|x_2)}{P(x_1|y=1) - P(x_1|y=0)} \quad (3)$$

Equation 3 gives $P(y = 0 | x_1, x_2)$ as a function of $P(x_1 | x_2)$ and $P(x_1 | y)$. This can lead to a significant simplification of the learning task when a large amount of unlabeled data is available. The surrogate learning algorithm involves the following.

- Estimating the quantity $P(x_1|x_2)$ from only the unlabeled data, by building a predictor from the feature space $X_2$ to the space $X_1$.
- Estimating the quantity $P(x_1|y)$ from a smaller labeled sample. If $X_1$ is finite and 'small', this can be done accurately.

Thus, the exemplary embodiment decouples the prediction problem into two separate tasks, one of which involves predicting $x_1$ from the remaining features. In other words, $x_1$ serves as a surrogate for the class label. Furthermore, for the two steps above there is no necessity for complete samples. The labeled examples can have the feature $x_2$ missing.

Example 1

The following example illustrates the intuition behind surrogate learning. Consider a two-class problem, where $x_1$ is a binary feature and $x_2$ is a one dimensional real-valued feature. The class-conditional distribution of $x_2$ for the class $y=0$ is Gaussian, and for the class $y=1$ is Laplacian as shown in FIG. 1.

Because of the class-conditional feature independence assumption, the joint distribution $P(x_1,x_2,y)$ can now be completely specified by fixing the joint probability $P(x_1, y)$. Let $P(x_1=0,y=0)=0.3$, $P(x_1=0,y=1)=0.1$, $P(x_1=1,y=0)=0.2$, and $P(x_1=1,y=1)=0.4$. The full joint distribution is depicted in FIG. 2. Also shown in FIG. 2 are the conditional distributions $P(x_1=0|x_2)$ and $P(y=0|x_1,x_2)$.

Assume a classifier to decide between $x_1=0$ and $x_1=1$ from the feature $x_2$. If this classifier is used to classify a sample that is from class $y=0$, it will most likely be assigned the 'label' $x_1=0$ (because, for class $y=0$, $x_1=0$ is more likely than $x_1=1$), and a sample that is from class $y=1$ is often assigned the 'label' $x_1=1$. Consequently the classifier between $x_1=0$ and $x_1=1$ provides information about the true class label $y$. This can also be seen in the similarities between the curves $P(y=0|x_1, x_2)$ to the curve $P(x_1|x_2)$.

Another way to interpret the example is to note that if a predictor for $P(x_1|x_2)$ were built on only the samples from the class $y=0$, $P(x_1=0|x_2)$ will be a constant value (0.6). Similarly the value of $P(x_1=0|x_2)$ for samples of class $y=1$ will also be a constant value (0.2). That is, the value of $P(x_1=0|x_2)$ for a sample is a good predictor of its class. However, surrogate learning builds the predictor $P(x_1|x_2)$ on samples from both classes and therefore additionally requires $P(x_1|y)$ to estimate the boundary between the classes.

Special Case of Surrogate Learning

The independence assumptions made in the setting above may seem too strong to hold in real problems, especially because the feature sets are required to be class-conditionally independent for both classes. The two applications described below are based on a special tailoring of the generalized surrogate learning described above.

The problem is set us as learning a classifier from $X=X_1 \times X_2$ to the set of classes $y=\{0,1\}$. The following assumptions are made:

1. $x_1$ is a binary random variable. That is, $X_1=\{0,1\}$.
2. $P(x_1,x_2|y=0)=P(x_1|y=0) P(x_2|y=0)$. The feature $x_1$ is required to be class-conditionally independent of the remaining features only for the class $y=0$.
3. $P(x_1=0, y=1)=0$. This assumption says that $x_1$ is a '100% recall' feature for $y=1$. (This assumption can be seen to trivially enforce the independence of the features for class $y=1$.)

Assumption 3 simplifies the learning task to the estimation of the probability $P(y=0|x_1=1, x_2)$ for every point $x_2 \in X_2$. We can proceed as before to obtain the expression in Equation 3, with $x_1=1$.

$$P(y=0|x_1=1, x_2) = \frac{P(x_1=1|y=0)}{P(x_1=1|x-2)} \cdot \frac{P(x_1=1|y=1) - P(x_1=1|x_2)}{P(x_1=1|y=1) - P(x_1=1|y=0)} \quad (4)$$
$$= \frac{P(x_1=1|y=0)}{P(x_1=1|x_2)} \cdot \frac{1 - P(x_1=1|x_2)}{1 - P(x_1=1|y=0)}$$
$$= \frac{P(x_1=1|y=0)}{P(x_1=1|x_2)} \cdot \frac{P(x_1=0|x_2)}{P(x_1=0|y=0)}$$
$$= \frac{P(x_1=1|y=0)}{P(x_1=0|y=0)} \cdot \frac{P(x_1=0|x_2)}{(1 - P(x_1=0|x_2))}$$

Equation 4 shows that $P(y=0|x_1=1, x_2)$ is a monotonically increasing function of $P(x_1=0|x_2)$. This means that after a predictor from $X_2$ to $X_1$ is built, one only need to establish the threshold on $P(x_1=0|x_2)$ to yield the optimum classification between $y=0$ and $y=1$. Therefore the learning proceeds as follows.

- Estimate the quantity $P(x_1|x_2)$ from only the unlabeled data, by building a predictor from the feature space $X_2$ to the binary space XI.
- Use a small labeled sample to establish the threshold on $P(x_1=0|x_2)$.

In the unlabeled data, we call the samples that have $x_1=1$ as the target samples and those that have $x_1=0$ as the background samples. The reason for this terminology is clarified in the following example.

Example 2

We consider a problem with distributions $P(x_2|y)$ identical to Example 1, except with the joint probability $P(x_1, y)$ given by $P(x_1=0, y=0)=0.3$, $P(x_1=0, y=1)=0.0$, $P(x_1=1, y=0)=0.2$, and $P(x1=1, y=1)=0.5$. The class-and-feature joint distribution is depicted in FIG. 3. Clearly, x1 is a 100% recall feature for y=1.

Note that on the samples from the class y=0 it is impossible to determine whether it is a sample from the target or background better than random by looking at the x2 feature, whereas a sample from the positive class is always a target. Therefore the background samples serve to delineate the positive examples among the targets.

Below are described applications of the surrogate learning approach to the problems of record linkage and paraphrase generation. These applications satisfy the assumptions in the second (100% recall) setting.

Exemplary Surrogate-Learning Based Record Linkage Method and System

FIG. 4 shows an exemplary system 400 for linking or merging data records using surrogate learning. In addition to processors 401, system 400 includes a memory 402, which stores a master database 410, an update database 420, a blocking module 430, a surrogate-learning-based matching module 440, and a linking module 450. (These components are implemented using machine-readable data and/or machine-executable instructions.) Processors 401 and memory 402 may take a variety of consolidated and/or distributed forms.

Record linkage generally refers to process of identification and merging of records of the same entity in different databases or the unification of records in a single database. The exemplary embodiment is presented as a solution to the problem of merging each of 20000 physician records, which are called the update database to the record of the same physician in a master database of one million records. The update database has fields that are absent in the master database and vice versa. The fields in common include the name (first, last and middle initial), several address fields, phone, specialty, and the year-of-graduation. Although the last name and year-of-graduation are consistent when present, the address, specialty, and phone fields have several inconsistencies owing to different ways of writing the address, new addresses, different terms for the same specialty, missing fields, etc. However, the name and year alone are insufficient for disambiguation. The exemplary embodiment had access to 500 manually matched update records for training and evaluation (about 40 of these update records were labeled as unmatchable with the information available).

As FIG. 4 shows the exemplary system and method for record linkage involves three main functions or processes: blocking at blocking module 430, matching at matching module 440, and linking at linking module 450.

Blocking, in the exemplary system and method, entails querying the master record database 410 with the last name of one or more update records from update database 420. As a result, a small set of candidate records is retrieved from the master record database, with the set of records having a high probability of containing the correct match for one or more of the update records.

Matching at module 440 generally defines features vectors for the one or more update records and corresponding candidate records, comparing and scoring these feature vectors, and identifying a most likely matching candidate record for each update record. Within the feature vectors, the feature values are either binary (verifying the equality of a particular field in the update and a master record) or continuous (for example, a normalized string edit distance between fields like street, address, first name, etc.).

More particularly, in the exemplary embodiment, the surrogate learning solution to the matching problem entails designating the binary feature of equality of year of graduation as the '100% recall' feature x1, and the remaining features are relegated to x2. The required conditions for exemplary surrogate learning are satisfied because 1) in the exemplary physician data it is highly unlikely for two records with different year-of-graduation to belong to the same physician and 2) if it is known that the update record and a master record belong to two different physicians, then knowing that they have the same (or different) year of graduation provides no information about the other features. Therefore all the feature vectors with the binary feature indicating equality of equality of year-of-graduation are targets and the remaining are backgrounds.

The exemplary embodiment uses feature vectors obtained from the records in all blocks from all 20000 update records to estimate the probability $P(x1|x2)$. Logistic regression can be used for this prediction task. For learning the logistic regression parameters, the exemplary embodiment discarded the feature vectors for which x1 was missing and performed mean imputation for the missing values of other features. Second, the probability $P(x1=1|y=0)$ was estimated straightforwardly from the counts of the different years-of-graduation in the master record database.

These estimates were used to assign the score $P(y=1|x1=1, x2)$ to the records in a block (cf. Equation 4). The score of 0 is assigned to feature vectors which have x1=0. The only caveat is calculating the score for feature vectors that had missing x1. For such vectors, the exemplary embodiment assigns the score $P(y=1|x2)=P(y=1|x1=1, x2)P(x1=1|x2)$. Estimates for both quantities on the right-hand side of this equation are readily obtainable. The highest scoring record in each block was then flagged as a match if it exceeded some appropriate threshold.

Linking module 450 links or merges the update record with the matching master record identified by matching module 440.

Exemplary Paraphrase Generation Using Surrogate Learning

Figure 5:
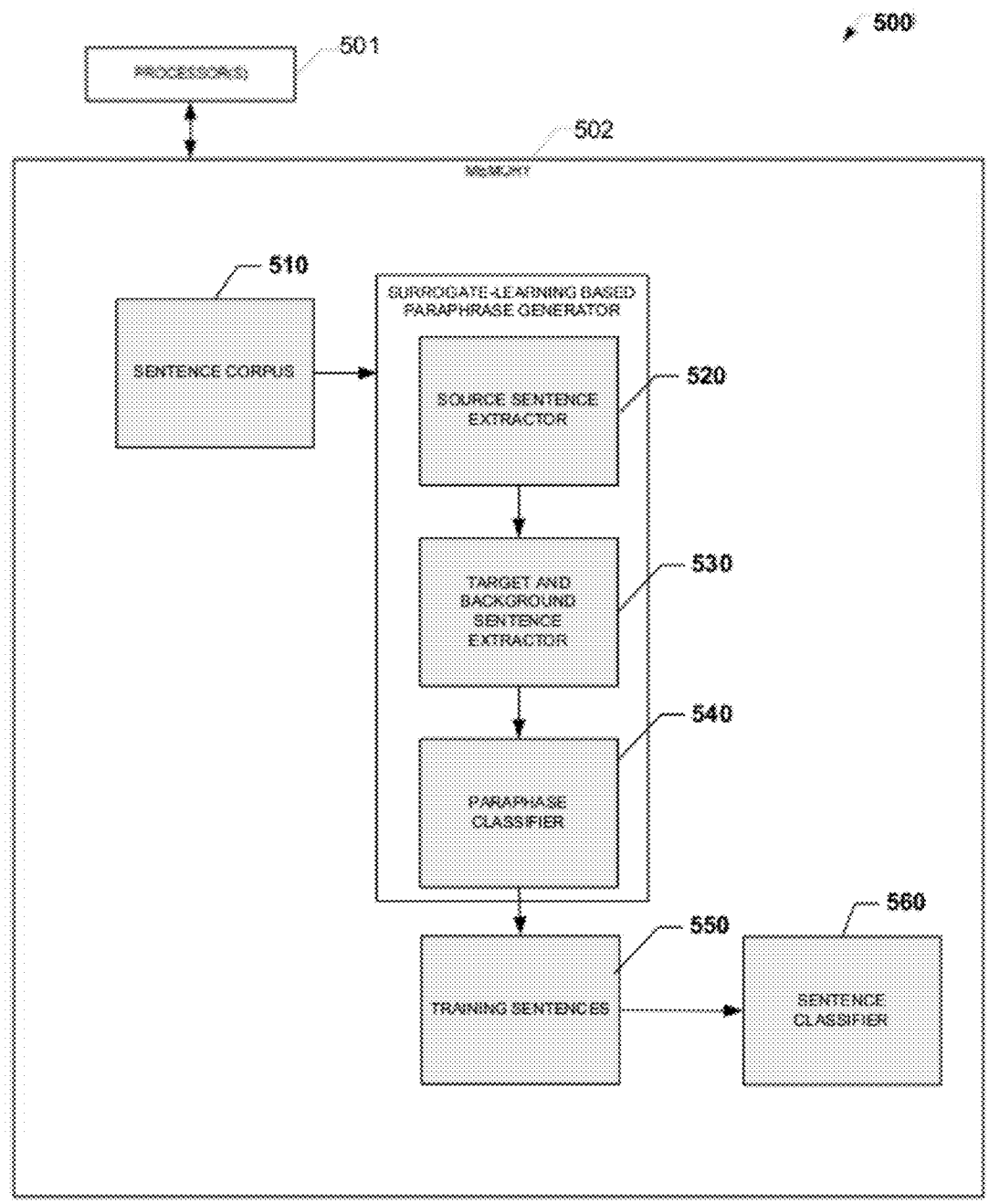
FIG. 5 is a block and flow diagram of an exemplary surrogate-learning-based system for generating training data for a sentence classifier, which corresponds to one or more embodiments of the present invention.

Sentence classification is often a preprocessing step for event or relation extraction from text. One of the challenges posed by sentence classification is the diversity in the language for expressing the same event or relationship. What is described here and shown in FIG. 5 is a surrogate learning-based system 500 and method for generating paraphrases for expressing the merger acquisition (MA) event between two organizations in a financial news document. The system uses the generated paraphrase sentences to train a sentence classifier that discriminates between MA and non-MA sentences occurring in an unlabeled corpus of news articles.

In addition to processors 501, system 500 includes a memory 502 which stores a sentence corpus or database 510, a source sentence extractor module 520, a target and background sentence extractor module 530, a paraphrase classifier module 540, training sentences 550, and a sentence classifier module 560. (These components are implemented using machine-readable data and/or machine-executable instructions.) Processors 501 and memory 502 may take a variety of consolidated and/or distributed forms.

The exemplary embodiment assumes that the unlabeled sentence corpus is time-stamped and named entity tagged with organizations. Also assumed is that an MA sentence must mention at least two organizations. The exemplary approach to generate paraphrases is the following.

At source sentence extractor module 520, the exemplary embodiment extracts a set of source sentences from the corpus 510 that match a few high-precision seed patterns (data structures). An example of a seed pattern used for the MA event is '<ORG1> acquired<ORG2>' where <ORG1> and <ORG2> are place holders for strings that have been tagged as organizations. An example of a source sentence that matches the seed is 'It was announced yesterday that <ORG>Google Inc. <ORG> acquired <ORG>Youtube <ORG>'.

The purpose of the seed patterns is to produce pairs of participant organizations in an MA event with high precision.

At target and background sentence extractor module 530, the exemplary embodiment extracts all sentences in the corpus (510) that contain at least two organizations such that at least one of them matches an organization in the extracted source sentences, and are within a time window of the matching source sentence. Of this set of sentences, all that contain two or more organizations from the same source sentence are designated as target sentences, and the rest are designated as background sentences.

In relation to surrogate learning, the binary "organization-pair equality" feature (both organizations in the current sentence being the same as the those in a source sentence) serves as the '100% recall' feature $x1$. Word unigram, bigram, and trigram features were used as $x2$. This setup satisfies the required conditions for surrogate learning because 1) if a sentence is about MA, the organization pair mentioned in it must be the same as that in a source sentence, (i.e., if only one of the organizations match those in a source sentence, the sentence is unlikely to be about MA) and 2) if an unlabeled sentence is non-MA, then knowing whether or not it shares an organization with a source does not provide any information about the language in the sentence. Since an organization is unlikely to have a MA relationship with two different organizations in the same time period, the backgrounds are unlikely to contain MA sentences, and moreover the language of the non-MA target sentences is indistinguishable from that of the background sentences. If the original unlabeled corpus is sufficiently large, the target set is expected to cover most of the paraphrases for the MA event but may contain many non-MA sentences as well.

At block 540, the task of classifying paraphrases entails filtering the target sentences that are non-MA and flagging the rest of the targets as paraphrases. To this end, the exemplary embodiment defines a classifier between the targets and backgrounds. The feature set used for this task was a bag of word unigrams, bigrams and trigrams, generated from the sentences and selected by ranking them by mutual information. A support vector machine (SVM) is used to learn to classify between the targets and backgrounds and the sentences were ranked according to the score assigned by the SVM (which is a proxy for $P(x1=1|x2)$ The scores are then thresholded to obtain the paraphrases, output and held at training sentences 550 for use in training sentence classifier module 560.

Example 3 below lists some sentences to illustrate the surrogate learning approach. Note that the targets may contain both MA and non-MA sentences but the backgrounds are unlikely to be MA.

Example 3

Seed Pattern: "bought <ORG>"
Source Sentences
1. <ORG>US Airways<ORG> had said it would have kept the <ORG>Delta<ORG> name if it bought <ORG>Delta<ORG>.
Target Sentences (SVM Score)
1. <ORG>US Airways<ORG> were to combine with a standalone <ORG>Delta<ORG>. (1.0008563)
2. <ORG>US Airways<ORG> argued that the nearly $10 billion acquisition of <ORG>Delta<ORG> would result in an efficiently run carrier that could offer low fares to fliers. (0.99958149)
3. <ORG>US Airways<ORG> is asking <ORG>Delta<ORG>'s official creditors committee to support postponing that hearing. (−0.99914371)
Background Sentences (SVM Score)
1. The cities have made various overtures to <ORG>US Airways<ORG>, including a promise from <ORG>America West Airlines<ORG> and the former <ORG>US Airways<ORG>. (0.99957752)
2. <ORG>US Airways<ORG> shares rose 8 cents to close at $53.35 on the <ORG>New York Stock Exchange<ORG>. (−0.99906444)

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:
1. A method of using a processor and a memory for classifying data associated with a feature space X to a set of classes $y=\{0,1\}$, wherein features defining the feature space X are partitioned into $X=X1 \times X2$, a random feature vector $x \in X$ is denoted correspondingly as $x=(x1, x2)$, and feature $x1$ is a binary random variable related to a block size, the method comprising:
  estimating $P(x1|x2)$ from a set of unlabeled data;
  estimating $P(x1=0|x2)$ from a set of labeled data;
  determining whether to classify a portion of the data to $y=0$ or $y=1$ based on the estimated $P(x1=0|x2)$;
  logically associating the portion of the data in the memory with the class $y=0$ or the class $y=1$ based on the determination; and
  linking data based at least in part on the logically associating step.
2. The method of claim 1, wherein the unlabeled data is a set of identity records, the binary random variable indicates whether a field of one of the identity records matches a corresponding field in another identity record contained in a master database, and the block size represents the number of identity records matched in the master database by the field of the one of the identity records.
3. The method of claim 1, wherein the feature $x1$ is a total recall feature for the class $y=1$ and represents an inverse of the block size.
4. The method of claim 1, wherein $P(x1,x2|y=0)=P(x1|y=0) P(x2|y=0)$.
5. The method of claim 1, wherein the data is a segment of text from a new article.

6. A system having a processor and a memory for classifying data associated with a feature space X to a set of classes y={0,1}, wherein features defining the feature space X are partitioned into X=X1×X2, a random feature vector x∈X is denoted correspondingly as x=(x1, x2), and feature x1 is a binary random variable related to a block size, the system further comprising:
- means for estimating P(x1|x2) from a set of unlabeled data;
- means for estimating P(x1=0|x2) from a set of labeled data;
- means for determining whether to classify a portion of the data to y=0 or y=1 based on the estimated P(x1=0\x2);
- means, responsive to the determination, for logically associating the portion of the data in the memory with the class y=0 or the class y=1; and
- means, responsive to the logical association, for linking data.

7. The system of claim 6, wherein the unlabeled data is a set of identity records, the binary random variable indicates whether a field of one of the identity records matches a corresponding field in another identity record contained in a master database, and the block size represents the number of identity records matched in the master database by the field of the one of the identity records.

8. The system of claim 6, wherein the feature x1 is a total recall feature for the class y=1 and represents an inverse of the block size.

9. The system of claim 6, wherein P(x1,x2|y=0)=P(x1|y=0) P(x2|y=0).

10. A method of using a processor and a memory for linking or merging update records with a master database of data records, the method comprising:
- performing a blocking operation and retrieving a set of candidate data records from the master database based on at least one update record;
- using surrogate learning to identify one of the candidate data records as a match for the one update record, the surrogate learning being based at least in part on a feature representing the inverse block size resulting from the blocking operation; and
- linking or merging the update record and the identified one of the candidate data records.

11. The method of claim 10 wherein the identified one of the candidate data records relates to a single entity and the linked or merged update record is determined to be associated with the single entity.

12. The method of claim 10 wherein using surrogate learning includes assigning the score P(y=1=x1=1,x2) to each of the retrieved set of candidate data records from the master database and determining a match based on the assigned score meeting or exceeding a predetermined threshold value.

13. A system having a processor and a memory for linking or merging update records with a master database of data records, the system comprising:
- a blocking module comprising a set of code stored in the memory and executed by the processor and adapted to perform a blocking operation and retrieve a set of candidate data records from the master database based on at least one update record;
- a surrogate-learning-based module comprising a set of code stored in the memory and executed by the processor and adapted to identify one of the candidate data records as a match for the one update record based at least in part on a feature representing the inverse block size resulting from the blocking operation; and
- a linking or merging module comprising a set of code stored in the memory and executed by the processor and adapted to link or merge the update record and the identified one of the candidate data records.

14. The system of claim 13 wherein the identified one of the candidate data records relates to a single entity and the linked or merged update record is determined to be associated with the single entity.

15. The system of claim 13 wherein the surrogate-learning-based module, when executed by the processor, is adapted to assign the score P(y=1|x1=1,x2) to each of the retrieved set of candidate data records from the master database and to determine a match based on the assigned score meeting or exceeding a predetermined threshold value.

* * * * *